(12) United States Patent
Ishikawa et al.

(10) Patent No.: US 9,360,595 B2
(45) Date of Patent: Jun. 7, 2016

(54) ANTIFOG OPTICAL ARTICLE AND MANUFACTURING METHOD THEREOF

(75) Inventors: Hiroko Ishikawa, Aichi (JP); Noboru Otani, Aichi (JP)

(73) Assignee: Tokai Optical Co., Ltd., Okazaki-shi, Aichi (JP)

( * ) Notice: Subject to any disclaimer, the term of this patent is extended or adjusted under 35 U.S.C. 154(b) by 173 days.

(21) Appl. No.: 14/122,489

(22) PCT Filed: Jul. 2, 2012

(86) PCT No.: PCT/JP2012/066854
§ 371 (c)(1),
(2), (4) Date: May 2, 2014

(87) PCT Pub. No.: WO2013/005710
PCT Pub. Date: Jan. 10, 2013

(65) Prior Publication Data
US 2014/0242380 A1 Aug. 28, 2014

(30) Foreign Application Priority Data
Jul. 6, 2011 (JP) .................................. 2011-149633

(51) Int. Cl.
G02B 1/10 (2015.01)
G02B 1/12 (2006.01)
C03C 17/34 (2006.01)
G02B 27/00 (2006.01)
C08J 7/04 (2006.01)

(52) U.S. Cl.
CPC .............. *G02B 1/10* (2013.01); *C03C 17/3405* (2013.01); *C08J 7/042* (2013.01); *G02B 1/12* (2013.01); *G02B 27/0006* (2013.01); *C03C 2217/75* (2013.01); *C03C 2217/76* (2013.01); *C08J 2433/14* (2013.01); *C08J 2475/08* (2013.01); *C08J 2483/04* (2013.01); *Y10T 428/264* (2015.01); *Y10T 428/31507* (2015.04)

(58) Field of Classification Search
CPC ............ C03C 17/3405; C03C 2217/75; C03C 2217/76; G02B 1/10; G02B 1/12; G02B 27/0006; C08J 7/042; C08J 2433/14; C08J 2475/08; C08J 2483/04; Y10T 428/264; Y10T 428/31507
USPC ........ 428/412, 425.5, 447, 500; 427/167, 536
See application file for complete search history.

(56) References Cited

U.S. PATENT DOCUMENTS

| 6,777,070 B1 * | 8/2004 | Murata et al. ................. 428/323 |
| 2006/0198991 A1 * | 9/2006 | Takiyama et al. ............. 428/172 |
| 2008/0266661 A1 * | 10/2008 | Nakamura .................... 359/485 |

FOREIGN PATENT DOCUMENTS

| JP | 62-030180 | 2/1987 |
| JP | 02-175784 | 7/1990 |
| JP | 2001-233638 | 8/2001 |
| JP | 2005-234066 | 9/2005 |

* cited by examiner

*Primary Examiner* — Thao T Tran
(74) *Attorney, Agent, or Firm* — Martine Penilla Group, LLP

(57) ABSTRACT

[Problem to be Solved]
To provide: an antifog optical article wherein a suitable water-repellent layer is formed in the process of application of antifog coating having a water-absorbing layer consisting primarily of urethane or acrylic resin having a polyoxyethylene chain on a base material; and a manufacturing method of the antifog optical article.

[Solution] A water-absorbing layer consisting primarily of urethane or acrylic resin having a polyoxyethylene chain represented as $-(CH_2CH_2O)n-$ is formed on a surface of a glass or plastic base material, a water-repellent layer consisting primarily of at least one of amino-modified silicone and mercapto-modified silicone is formed on a surface of the water-absorbing layer, and a contact angle with respect to water on a surface of the water-repellent layer is set equal to or larger than 100 degrees.

6 Claims, No Drawings

ANTIFOG OPTICAL ARTICLE AND MANUFACTURING METHOD THEREOF

TECHNICAL FIELD

The present invention relates to a transparent optical article such as glass or a lens, which requires an antifogging function, and a manufacturing method of the optical article.

BACKGROUND ART

Conventionally, some techniques to prevent fogging of a lens have been proposed. Fogging prevention is divided in terms of actions into two broad types: using a so-called wetting phenomenon; and coating a lens surface with water-absorbing resin. Here, the former type of using a wetting phenomenon is to narrow a contact angle with respect to water attached to a lens so as to prevent the water from becoming droplets, and application of surfactant on a lens surface is the most common way. However, in a case where surfactant is applied, it is difficult to maintain the antifogging performance. For example, the surfactant may come off easily from a lens surface when being wiped with water. Accordingly, a product having an enhanced fixing property with respect to a lens surface has been proposed, though antifogging performance thereof is still not maintained sufficiently.

Accordingly, attention is now focused on the latter type of coating (forming a water-absorbing layer) a lens surface with water-absorbing resin.

In a case of antifog coating using a water-absorbing layer, it is common to knead surfactant into the water-absorbing layer and use both of water absorption and a wetting phenomenon in order to maintain an antifog property even when exceeding water-absorbing capacity. However, when the surfactant is lost by being washed with water or the like, a contact angle with respect to a water-absorbing layer surface is widened (50 to 90 degrees) and therefore visibility is extremely lowered by scattering of light by water droplets due to condensation by exceeding the water-absorbing capacity.

Moreover, a water-absorbing layer has problems due to the nature thereof, such as low slippage of a surface, especially low strength at the time of water absorption or low weather resistance or the like.

Examples of such an antifog coating technique having improved slippage and strength of a water-absorbing layer are Patent Document 1, Patent Document 2 and Patent Document 3. In these antifog coating techniques, a water-absorbing layer is first formed and then a water-repellent layer is formed on the surface of the water-absorbing layer, so as to improve slippage and strength.

PRIOR ART DOCUMENTS

Patent Documents

Patent Document 1: Japanese Published Unexamined Patent Application No. H02-175784
Patent Document 2: Japanese Published Unexamined Patent Application No. 2001-233638
Patent Document 3: Japanese Published Unexamined Patent Application No. 2005-234066

SUMMARY OF THE INVENTION

Problems to be Solved by the Invention

An important point in an antifog coating technique having a water-absorbing layer to which water-repellent treatment is to ensure visibility even when condensation occurs by the exceeding water-absorbing capacity, though a technique employing such an idea has not been proposed. Moreover, since such a technique is not to apply coating agent many times in contrast to a case where a wetting phenomenon is used, it is required to realize a favorable wiping property with respect to dirt and high durability to prevent coating from coming off even when being wiped many times, in addition to the main goal of an antifog property. Moreover, since an optical article, especially a spectacle lens, often contacts directly with water when the user gets in a bath or the like, water resistance or weather resistance is also required. Accordingly, the present applicant proposes to use urethane or acrylic resin having a polyoxyethylene chain having especially favorable durability and water resistance (weather resistance) for a water-absorbing layer as a primary component.

The present invention has been made by focusing on such problems existing in conventional techniques. The object thereof is to provide: an antifog optical article wherein a suitable water-repellent layer is formed in the process of application of antifog coating having a water-absorbing layer consisting primarily of urethane or acrylic resin having a polyoxyethylene chain on a base material; and a manufacturing method of the antifog optical article.

Means of Solving the Problems

For solving the above problems, the invention of claim 1 is characterized in that a water-absorbing layer consisting primarily of urethane or acrylic resin having a polyoxyethylene chain represented as —$(CH_2CH_2O)n$- is formed on a surface of a glass or plastic base material, a water-repellent layer consisting primarily of at least one of amino-modified silicone and mercapto-modified silicone is formed on a surface of the water-absorbing layer, and a contact angle with respect to water on a surface of the water-repellent layer is set equal to or larger than 100 degrees.

The invention of claim 2 has a structure of the invention according to claim 1, characterized in that thickness of the water-absorbing layer is 1.0 to 50 μm.

The invention of claim 3 has a structure of the invention according to claim 1 or 2, characterized in that thickness of the water-repellent layer is 0.5 to 20 nm.

The invention of claim 4 is characterized in that a water-absorbing layer consisting primarily of urethane or acrylic resin having a polyoxyethylene chain is formed on a surface of a glass or plastic base material, surface activation treatment is applied to a surface of the water-absorbing layer and then a water-repellent layer consisting primarily of at least one of amino-modified silicone and mercapto-modified silicone is formed on a surface of the water-absorbing layer, so that a contact angle with respect to water on a surface of the water-repellent layer is set equal to or larger than 100 degrees.

The invention of claim 5 has a structure of the invention according to claim 4, characterized in that a water-soluble component is removed from a surface and an inner part of the water-absorbing layer before the surface activation treatment.

The invention of claim 6 has a structure of the invention according to claim 4 or 5, characterized in that the surface activation treatment is plasma treatment.

Here, the concept of an optical article widely includes articles such as a lens for a spectacle, a lens for a binocular or a telescope, window glass, an optical display like a CRT or an FPD, and an optical filter.

As a base material, inorganic glass or plastic can be used. As inorganic glass, glass consisting primarily of $SiO_2$ can be used. Moreover, examples of a plastic base material are polymethyl methacrylate and copolymer thereof, polycarbonate, polydiethyleneglycol-bis-allylcarbonate (CR-39), cellulose acetate, polyethylene terephthalate, polyvinyl chloride, polyurethane resin, polythiourethane and sulfur-containing resins.

Moreover, pretreatment is usually performed for a base material. Examples of pretreatment are degreasing treatment for a base material surface with acid/alkali, corona treatment, plasma treatment, ultrasonic cleaning. These pretreatments remove dirt which may influence adhesion of a layer on a base material surface.

Moreover, a primer layer (substrate layer) may be interposed between a base material and a water-absorbing layer which is a layer above the base material. That is, when a primer layer is formed on a surface of a base material, the primer layer is to be interpreted as a surface of the base material. Here, the primer layer is a junction layer to be located at this position in order to enhance adhesion of the water-absorbing layer with a lens base material in the present invention, and is made of, for example, urethane series resin, acrylic resin, methacrylic resin, organosilicon series resin. Especially, when a base material is inorganic glass, an organosilicon series resin primer layer such as aminosilane is required in order to firmly fix the water-absorbing layer. A primer layer is generally formed by (a dip method) dipping a lens base material in primer liquid. A wet method such as a spray method, a roll coating method or a spin coating method may also be used.

On a base material (or primer layer) surface, a water-absorbing layer consisting primarily of urethane or acrylic resin having a polyoxyethylene chain represented as —$(CH_2CH_2O)n$- is formed. Here, urethane and acrylic resin having a polyoxyethylene chain are preferable because both of urethane and acrylic resin have favorable durability and water resistance (weather resistance). That is, urethane and acrylic resin having a polyoxyethylene chain have a preferable hydrophilic nature and form a cross-linked structure so as to be bonded strongly with a base material or a primer layer in the process of formation of a water-absorbing layer.

In order to adjust physical properties of a water-absorbing layer, a polyoxypropylene chain in addition to a polyoxyethylene chain may be included.

Urethane having a polyoxyethylene chain is obtained by stoichiometrically reacting a mixture consisting primarily of a polyisocyanate compound having at least two isocyanate groups in the molecule and hydrophilic polyol having a polyoxyethylene chain. A specific example is an antifog coating agent VISGARD (made by FSI, U.S. Pat. No. 5,877,254).

Moreover, an example of acrylic resin having a polyoxyethylene chain is obtained by applying thermal curing to a mixture consisting primarily of glycidyl methacrylate-hydroxy methacrylate copolymer and polyoxyethylene sorbitol as in Japanese Published Unexamined Patent Application No. S62-28825 (NIPPON SHEET GLASS COMPANY, LTD.) or by applying ultraviolet curing to acrylate having a polyoxyethylene chain as in ARONIX (made by TOAGOSEI CO., LTD.).

For forming a water-absorbing layer, application liquid is prepared by mixing the above component into non-reactive solvent. In a case of curing by giving energy with ultraviolet light, acrylate having a polyoxyethylene chain can also be used as application liquid without using solvent. A film can be formed by applying the prepared application liquid on a base material (or a primer layer) surface by a wet method such as a dipping method, a spray method, a roll coating method or a spin coating method and applying heat or ultraviolet irradiation.

Examples of solvent are aliphatic hydrocarbons solvent such as hexane, heptane or cyclohexane, aromatic hydrocarbons solvent such as benzene, toluene or xylene, esters such as ethyl acetate or butyl acetate, alcohols such as methanol or butanol, aprotic polar solvent such as dimethylformamide, dimethyl sulfoxide, N-methylpyrrolidone or pyridine, ketones such as acetone, methyl ethyl ketone or methyl isobutyl ketone, and water. These solvents can be used alone or in combination.

Thickness of a water-absorbing layer is 1.0 to 50 μm, and 5 to 20 μm is more preferable (especially for a lens) so as to have a sufficient water absorption property and not to influence optical characteristics.

It is to be noted that a water-absorbing layer preferably contains an ultraviolet-absorbing agent of benzophenone type or benzotriazole type in the case of a partially-urethane resin base material or a dyed base material wherein degradation caused by ultraviolet light is a concern.

A water-repellent layer consisting primarily of reactive silicone is formed in a layer above the water-absorbing layer.

As reactive silicone is obtained by introducing a reactive functional group into polydimethylsiloxane (silicone) made by polycondensation of an organosilicon compound, reactive silicone in the present invention especially consists primarily of at least one of amino-modified silicone and mercapto-modified silicone.

An amino group and a mercapto group in reactive silicone are considered high-reactive with respect to a water-absorbing layer having ester linkage. On the other hand, silicone or fluoroalkylsilane having a silanol group is low-reactive with respect to a water-absorbing layer and has poor water-repellent performance.

Equivalent weight of functional groups in amino-modified silicone and mercapto-modified silicone is 1000 to 10000.

A water-repellent layer can be obtained by forming a film of solution adjusted by mixing the above component into non-reactive solvent on a water-absorbing layer surface, using a wet method such as a dipping method, a spray method, a roll coating method or a spin coating method. Examples of the above non-reactive solvent are aliphatic hydrocarbons solvent such as hexane, heptane or cyclohexane and ketones solvent such as acetone, methyl ethyl ketone or methyl isobutyl ketone. These solvents can be used alone or in combination.

Thickness of a water-repellant layer is 0.5 to 20 nm, and is preferably equal to or smaller than 10 nm in order not to influence water-absorbing characteristics of the water-absorbing layer.

A contact angle with respect to water on a water-repellant layer surface is equal to or larger than 100 degrees when a water-repellant layer of modified silicone is formed normally. The contact angle depends on the degree of residual water-soluble components such as surfactant included in a water-absorbing layer or on the degree of fixation of modified silicone to a water-absorbing layer surface. Consequently, for realizing a large contact angle, it is preferable to remove water-soluble components by treatment for a water-absorbing layer with water, alcohol or the like and enhance reactivity by surface activation treatment. As treatment processing in this stage, physical treatment processing is preferable (corona treatment, plasma treatment, ultraviolet treatment or the like), and plasma treatment processing is more preferable.

BEST MODE FOR CARRYING OUT THE INVENTION

The following description will give specific descriptions on the present invention using examples, though the present invention is not limited thereto.

Example 1

A. On Base Material

A flat lens of lens power of 0.00 having optical characteristics of a refractive index of 1.5 and an Abbe's number of 59 was formed from polydiethylene glycol-bis-allyl carbonate (CR-39) using a glass mold.

In the following description, a similar base material is used in the respective examples and comparative examples excluding Example 7.

B. Formation of Water-Absorbing Layer

Solution (Trade Name: VISGARD made by FSI) consisting primarily of water-absorbing urethane having a polyoxyethylene chain and a polyoxypropylene chain was applied on the above base material by a dipping method and cured by heating at 125° C. for one hour, so that a water-absorbing layer having a film thickness of 5.0 μm was formed.

Next, the base material on which the water-absorbing layer was formed was dipped in pure water and cleaned for 30 minutes under conditions of 200 W and 35 kHz using an ultrasonic cleaner. The base material taken out after cleaning was dried under conditions of 80° C. and 10 minutes in an oven.

Next, the base material was set in a plasma treatment equipment and plasma treatment was performed under conditions of an oxygen gas flow rate of 50 ml/minute, 250 W and 40 seconds.

C. Formation of Water-Repellent Layer (Top Layer)

Amino-modified silicone compound (Trade Mark: KF-869 made by SHIN-ETSU CHEMICAL CO., LTD.) was diluted with n-hexane to obtain a solution of 0.3 wt %. The base material on which the water-absorbing layer was formed was dipped (a dipping method) in the solution, taken out and then cured under conditions of 100° C. and 15 minutes in an oven. After curing, excess attachment was wiped off with acetone and then an evaluation was made.
[Evaluation Result]
The result is shown collectively in Table 1.

Example 2

A. Omitted

B. Formation of Water-Absorbing Layer

In Example 2, a water-absorbing layer was formed under the same conditions as those of Example 1, and then a base material on which the water-absorbing layer was formed was dipped in isopropyl alcohol and cleaned for 30 minutes under conditions of 200 W and 35 kHz by the same ultrasonic cleaner as the above. Next, the base material was taken out and then dried under conditions of 80° C. and 10 minutes in an oven. Next, plasma treatment was performed under the same conditions as those of Example 1.

C. Formation of Water-Repellent Layer (Top Layer)

In Example 2, a water-repellent layer was formed under the same conditions as those of Example 1.
[Evaluation Result]
The result is shown collectively in Table 1.

Example 3

A. Omitted

B. Formation of Water-Absorbing Layer

In Example 3, a water-absorbing layer was formed under the same conditions as those of Example 1, and then a base material on which the water-absorbing layer was formed was dipped in pure water and cleaned for 5 minutes under conditions of 200 W and 35 kHz by the same ultrasonic cleaner as the above one. Next, the base material was taken out and then dried under conditions of 80° C. and 10 minutes in an oven. Next, plasma treatment was performed under the same conditions as those of Example 1.

C. Formation of Water-Repellent Layer (Top Layer)

In Example 3, a water-repellent layer was formed under the same conditions as those of Example 1.
[Evaluation Result]
The result is shown collectively in Table 1.

Example 4

A. Omitted

B. Formation of Water-Absorbing Layer

In Example 4, a water-absorbing layer was formed under the same conditions as those of Example 1, and then a base material on which the water-absorbing layer was formed was dipped in isopropyl alcohol and cleaned for 5 minutes under conditions of 200 W and 35 kHz by the same ultrasonic cleaner as the above one. Next, the base material was taken out and then dried under conditions of 80° C. and 10 minutes in an oven. Next, plasma treatment was performed under the same conditions as those of Example 1.

C. Formation of Water-Repellent Layer (Top Layer)

In Example 4, a water-repellent layer was formed under the same conditions as those of Example 1.
[Evaluation Result]
The result is shown collectively in Table 1.

Example 5

A. Omitted

B. Formation of Water-Absorbing Layer

In Example 5, a water-absorbing layer was formed under the same conditions as those of Example 1, and then a lens on which the water-absorbing layer was formed was dipped in pure water and cleaned for 5 minutes under conditions of 200 W and 35 kHz by the same ultrasonic cleaner as the above. After the first cleaning, the base material was taken out once, dipped in isopropyl alcohol this time and cleaned for 5 minutes under similar conditions. The base material taken out after the second cleaning was dried under conditions of 80° C. and 10 minutes in an oven. Next, plasma treatment was performed under the same conditions as those of Example 1.

C. Formation of Water-Repellent Layer (Top Layer)

In Example 5, a water-repellent layer was formed under the same conditions as those of Example 1.
[Evaluation Result]
The result is shown collectively in Table 1.

Example 6

A. Omitted

B. Formation of Water-Absorbing Layer

Solution (L-1) consisting primarily of water-absorbing acrylic resin having a polyoxyethylene chain in the following compounding ratio was applied by a dipping method, dried by air drying and then cured by heating for 1 hour at 125° C., so that a water-absorbing layer having a film thickness of 7.0 μm was formed.

Compounding Ratio of L-1

(A-1) 6:4 Copolymer of Glycidyl Methacrylate (GMA)-2-Hydroxyethyl Methacrylate (HEMA) . . . 167 parts by weight (A-2) Polyoxyethylene Sorbitol . . . 50 parts by weight (A-3) Cross-linking Agent (Trade Mark: DENACOL EX-313 made by NAGASE CHEMTEX CORPORATION) . . . 25 parts by weight (A-4) Ammonium Perchlorate . . . 1.3 parts by weight (A-5) Surfactant (Trade Mark: LIPONOX NCN made by LION CORPORATION) . . . 25 parts by weight Next, cleaning and plasma treatment were performed under conditions similar to those of Example 5.

C. Formation of Water-Repellent Layer (Top Layer)

In example 6, a water-repellent layer was formed under the same conditions as those of Example 1.
[Evaluation Result]
The result is shown collectively in Table 1.

Example 7

A. A Polycarbonate Plate Having a Thickness of 2 Mm was Used as a Base Material

B. Formation of Water-Absorbing Layer

Ultraviolet cure antifog coating consisting primarily of water-absorbing acrylic resin having a polyoxyethylene chain was applied on the base material. Thickness of the water-absorbing layer was 7.0 μm. Next, cleaning and plasma treatment were performed for the base material having the water-absorbing layer under conditions similar to those of Example 5.

C. Formation of Water-Repellent Layer (Top Layer)

In example 7, a water-repellent layer was formed under the same conditions as those of Example 1.
[Evaluation Result]
The result is shown collectively in Table 1.

Example 8

A. Omitted

B. Formation of Water-Absorbing Layer

In Example 8, a water-absorbing layer was formed under the same conditions as those of Example 1, and then cleaning and plasma treatment were performed for a base material on which the water-absorbing layer was formed under conditions similar to those of Example 5.

C. Formation of Water-Repellent Layer (Top Layer)

Mercapto-modified silicone compound (Trade Mark: KF-2001 made by SHIN-ETSU CHEMICAL CO., LTD.) was diluted with n-hexane to obtain a solution of 0.3 wt %. The base material on which the water-absorbing layer was formed was dipped (a dipping method) in the solution, taken out and then cured under conditions of 100° C. and 15 minutes in an oven. After curing, excess attachment was wiped off with acetone and then an evaluation was made.
[Evaluation Result]
The result is shown collectively in Table 1.

Example 9

A. Omitted

B. Formation of Water-Absorbing Layer

In Example 9, a water-absorbing layer was formed under the same conditions as those of Example 1, and then a lens on which the water-absorbing layer was formed was dipped in pure water and cleaned for 5 minutes under conditions of 200 W and 35 kHz by the same ultrasonic cleaner as the above one. The base material was taken out once after the first cleaning, dipped in isopropyl alcohol this time and cleaned for 5 minutes under similar conditions. The base material taken out after the second cleaning was dried under conditions of 80° C. and 10 minutes in an oven. Next, corona discharge treatment equipment (MULTIDYNE 1000 made by NAVITAS CO., LTD.) was used for treatment at a distance of 20 mm for 20 seconds.

C. Formation of Water-Repellent Layer (Top Layer)

In Example 9, a water-repellent layer was formed under the same conditions as those of Example 1.
[Evaluation Result]
The result is shown collectively in Table 1.

Comparative Example 1

A. Omitted

B. Formation of Water-Absorbing Layer

In Comparative Example 1, a water-absorbing layer was formed under the same conditions as those of Example 1, though cleaning with pure water and/or isopropyl alcohol and plasma treatment were not performed.

C. Formation of Water-Repellent Layer (Top Layer)

In Comparative Example 1, a water-repellent layer was not formed.
[Evaluation Result]
The result is shown collectively in Table 2.

Comparative Example 2

A. Omitted

B. Formation of Water-Absorbing Layer

In Comparative Example 2, a water-absorbing layer was formed under the same conditions as those of Example 1, though cleaning with pure water and/or isopropyl alcohol and plasma treatment were not performed.

C. Formation of Water-Repellent Layer (Top Layer)

In Comparative Example 2, a water-repellent layer was formed under the same conditions as those of Example 1.
[Evaluation Result]
The result is shown collectively in Table 2.

Comparative Example 3

A. Omitted

B. Formation of Water-Absorbing Layer

In Comparative Example 3, a water-absorbing layer was formed under the same conditions as those of Example 1, though cleaning with pure water and/or isopropyl alcohol was not performed. Plasma treatment similar to that of Example 1 was performed without performing cleaning.

C. Formation of Water-Repellent Layer (Top Layer)

In Comparative Example 3, a water-repellent layer was formed under the same conditions as those of Example 1.
[Evaluation Result]
The result is shown collectively in Table 2.

Comparative Example 4

A. Omitted

B. Formation of Water-Absorbing Layer

In Comparative Example 4, a water-absorbing layer was formed under the same conditions as those of Example 1 and cleaning was performed under conditions similar to those of Example 5. After that, however, plasma treatment was not performed.

C. Formation of Water-Repellent Layer (Top Layer)

In Comparative Example 4, a water-repellent layer was formed under the same conditions as those of Example 1.
[Evaluation Result]
The result is shown collectively in Table 2.

Comparative Example 5

A. Omitted

B. Formation of Water-Absorbing Layer

Polyvinyl alcohol (saponification degree of 91 to 94, polymerization degree equal to or smaller than 1000) of 38 g was introduced into distilled water of 267 g and heated so as to cause dissolution (this will be hereinafter referred to as solution b-1). On the other hand, water solution of 0.01N hydrochloric acid of 7.3 g was held at 10° C. and delivered by drops into γ-glycosidic propyltrimethoxysilane so as to cause hydrolysis. Hydrolysate was mixed with the solution b-1, and methanol silica sol (average particle diameter of approximately 13 μm and solid matter of 30%) of 50 g, fluorochemical surfactant of 0.3 g, 1,4-dioxane of 105 g, dimethylimidazolidinone of 50 g, acetylacetone aluminum of 1.5 g were stirred into the solution sequentially so as to cause solution mixing and stirred for 1 hour to prepare the coating agent.

The coating agent was applied on the base material by a dipping method, the base material was dried by air drying and then cured by heating for 2 hours at 130° C., so that a water-absorbing layer having a film thickness of 5.0 μm was formed.

Next, cleaning and plasma treatment were performed for a lens on which the water-absorbing layer was formed under conditions similar to those of Example 5.

C. Formation of Water-Repellent Layer (Top Layer)

In Comparative Example 5, a water-repellent layer was formed under the same conditions as those of Example 1.
[Evaluation Result]
The result is shown collectively in Table 2.

Comparative Example 6

A. Omitted

B. Formation of Water-Absorbing Layer

In Comparative Example 6, a water-absorbing layer was formed under the same conditions as those of Example 1, and then cleaning and plasma treatment were performed for a base material on which the water-absorbing layer was formed under conditions similar to those of Example 5.

C. Formation of Water-Repellent Layer (Top Layer)

Fluorine-silane compound (Trade Mark: KY-130 made by SHIN-ETSU CHEMICAL CO., LTD.) was diluted with fluorine series solvent (Trade Mark: HFE-7200 made by 3M) to obtain a solution of 0.3 wt %. The base material on which the water-absorbing layer was formed was dipped (a dipping method) in the solution, taken out and then cured under conditions of 100° C. and 15 minutes in an oven. After curing, excess attachment was wiped off with acetone and then an evaluation was made.
[Evaluation Result]
The result is shown collectively in Table 2.

Comparative Example 7

A. Omitted

B. Formation of Water-Absorbing Layer

In Comparative Example 7, a water-absorbing layer was formed under the same conditions as those of Example 1, and then cleaning and plasma treatment were performed for a base material on which the water-absorbing layer was formed under conditions similar to those of Example 5.

C. Formation of Water-Repellent Layer (Top Layer)

Reactive silicone oil (Trade Mark: X-24-9011 made by SHIN-ETSU CHEMICAL CO., LTD.) of mono-terminal silanol was diluted with n-hexane to obtain a solution of 0.3 wt %. The base material on which the water-absorbing layer was formed was dipped (a dipping method) in the solution, taken out and then cured under conditions of 100° C. and 15 minutes in an oven. After curing, excess attachment was wiped off with acetone and then an evaluation was made.
[Evaluation Result]
The result is shown collectively in Table 2.

Comparative Example 8

A. Omitted

B. Formation of Water-Absorbing Layer

In Comparative Example 8, a water-absorbing layer was formed under the same conditions as those of Example 1, and then cleaning and plasma treatment were performed for a base material on which the water-absorbing layer was formed under conditions similar to those of Example 5.

C. Formation of Water-Repellent Layer (Top Layer)

Epoxy-modified silicone compound (Trade Mark: KF-101 made by SHIN-ETSU CHEMICAL CO., LTD.) was diluted with n-hexane to obtain a solution of 0.3 wt %. The base material on which the water-absorbing layer was formed was dipped (a dipping method) in the solution, taken out and then cured under conditions of 100° C. and 15 minutes in an oven. After curing, excess attachment was wiped off with acetone and then an evaluation was made.
[Evaluation Result]
The result is shown collectively in Table 2.

Comparative Example 9

A. Omitted

B. Formation of Water-Absorbing Layer

In Comparative Example 9, a water-absorbing layer was formed under the same conditions as those of Example 1, and then cleaning and plasma treatment were performed for a base material on which the water-absorbing layer was formed under conditions similar to those of Example 5.

C. Formation of Water-Repellent Layer (Top Layer)

Dimethyl silicone oil (Trade Mark: KF-96 made by SHIN-ETSU CHEMICAL CO., LTD.) was diluted with n-hexane to obtain a solution of 0.3 wt %. The base material on which the water-absorbing layer was formed was dipped (a dipping method) in the solution, taken out and then cured under conditions of 100° C. and 15 minutes in an oven. After curing, excess attachment was wiped off with acetone and then an evaluation was made.
[Evaluation Result]
The result is shown collectively in Table 2.

TABLE 1

| | | Example 1 | Example 2 | Example 3 | Example 4 | Example 5 |
|---|---|---|---|---|---|---|
| Water-absorbing Layer | Type | Urethane | Urethane | Urethane | Urethane | Urethane |
| Cleaning Method | Liquid | Water | IPA | Water | IPA | Water/IPA |
| | Time (minutes) | 30 | 30 | 5 | 5 | 5/5 |
| | Ultrasonic Cleaning | Done | Done | Done | Done | Done |
| Activation | | Plasma | Plasma | Plasma | Plasma | Plasma |
| Water-repellent Layer | | Amino-modified | Amino-modified | Amino-modified | Amino-modified | Amino-modified |
| Antifog Property | Water Absorption Property | ○ | ○ | ○ | ○ | ○ |
| | Visibility | ○-△ | ○ | △ | ○-△ | ○ |
| Water Repellency | Water Contact Angle | 102.1 | 103.6 | 103.2 | 103.7 | 104.1 |
| | Initial Slippage | ◎-○ | ◎ | ◎ | ◎ | ◎ |
| | Secondary Slippage | ◎-○ | ◎ | ◎ | ◎ | ◎ |

| | | Example 6 | Example 7 | Example 8 | Example 9 |
|---|---|---|---|---|---|
| Water-absorbing Layer | Type | Acrylic | Acrylic | Urethane | Urethane |
| Cleaning Method | Liquid | Water/IPA | Water/IPA | Water/IPA | Water/IPA |
| | Time (minutes) | 5/5 | 5/5 | 5/5 | 5/5 |
| | Ultrasonic Cleaning | Done | Done | Done | Done |
| Activation | | Plasma | Plasma | Plasma | Corona |
| Water-repellent Layer | | Amino-modified | Amino-modified | Mercapto-modified | Amino-modified |
| Antifog Property | Water Absorption Property | ○ | ○ | ○ | ○ |
| | Visibility | ○ | ○ | ○-△ | ○ |

TABLE 1-continued

| | | | | | |
|---|---|---|---|---|---|
| Water Repellency | Water Contact Angle | 107 | 106.3 | 101.5 | 104.1 |
| | Initial Slippage | ◎ | ◎ | ◎-○ | ◎ |
| | Secondary Slippage | ◎ | ◎ | ◎-○ | ◎ |

TABLE 2

| | | Comparative Example 1 | Comparative Example 2 | Comparative Example 3 | Comparative Example 4 | Comparative Example 5 |
|---|---|---|---|---|---|---|
| Water-absorbing Layer | Type | Urethane | Urethane | Urethane | Urethane | PVA + SiO$_2$ |
| Cleaning Method | Liquid | — | — | — | Water/IPA | Water/IPA |
| | Time (minutes) | — | — | — | 5/5 | 5/5 |
| | Ultrasonic Cleaning | — | — | — | Done | Done |
| Activation | | — | — | Plasma | — | Plasma |
| Water-repellent Layer | | — | Amino-modified | Amino-modified | Amino-modified | Amino-modified |
| Antifog Property | Water Absorption Property | ○ | ○ | ○ | ○ | Δ |
| | Visibility | Water Film *1 | X | X | Δ | X |
| Water Repellency | Water Contact Angle | <10 | 53.9 | 59.3 | 97 | 45.7 |
| | Initial Slippage | X | ○-Δ | ○ | ○ | ○ |
| | Secondary Slippage | X | ○-Δ | ○ | ○ | ○ |

| | | Comparative Example 6 | Comparative Example 7 | Comparative Example 8 | Comparative Example 9 |
|---|---|---|---|---|---|
| Water-absorbing Layer | Type | Urethane | Urethane | Urethane | Urethane |
| Cleaning Method | Liquid | Water/IPA | Water/IPA | Water/IPA | Water/IPA |
| | Time (minutes) | 5/5 | 5/5 | 5/5 | 5/5 |
| | Ultrasonic Cleaning | Done | Done | Done | Done |
| Activation | | Plasma | Plasma | Plasma | Plasma |
| Water-repellent Layer | | Fluorine-Silane | Mono-terminal Silanol | Epoxy-modified | Straight |
| Antifog Property | Water Absorption Property | ○ | ○ | ○ | ○ |
| | Visibility | ○ | X | X | X |
| Water Repellency | Water Contact Angle | 105.5 | 95.0 | 71.8 | 86.6 |
| | Initial Slippage | ◎ | ○ | ○ | ○ |
| | Secondary Slippage | ○ *2 | ○ | ○ | ○ |

*1 A water film was formed and fogging did not occur.
*2 A water contact angle in secondary slippage evaluation narrowed to 94.7 degrees.

On Performance Evaluation Method (a) Water Absorption Property in Antifog Property Exhaled breath was applied for approximately 2 seconds to see the degree of fogging and an evaluation was made based on the following criteria.

Criteria

○: Fogging does not occur for 2 seconds of breath exhalation.

Δ: Fogging occurs in 1 to 2 seconds.

x: Fogging occurs immediately (no effect).

(b) Visibility in Antifog Property

Exhaled breath (or vapor) was applied until fogging occurs on a lens surface and an object such as a watch is seen through a part of the lens where fogging has occurred to check whether the shape or the face can be recognized or not.

○: Details of the object can be recognized clearly through a lens where fogging has occurred.

Δ: An overall view of the object can be recognized through a lens where fogging has occurred.

x: The shape of the object cannot be recognized well since fogging has occurred.

(c) Contact Angle of Pure Water

FACE CA-D-type contact angle measuring equipment made by KYOWA INTERFACE SCIENCE CO., LTD. was used as measurement equipment for a measurement under conditions of 23° C. and humidity of 60% RH. A syringe (needle having a diameter of approximately 0.7 mm) was used to make a droplet of pure water weighing 5 mg. A sample table was lifted up so as to make the droplet contact with a central part of a lens surface so as to move the droplet of pure water onto the lens surface, and the contact angle was measured within 30 seconds.

(d) Initial Slippage

Within 24 hours from formation of a water-repellent layer, paper for wiping (Trade Mark: PURE LEAF made by OZU CORPORATION) was used to evaluate the method of slip in wiping in four phases.

◎: It is possible to wipe extremely smoothly.

○: It is possible to wipe smoothly.

Δ: Slight friction is felt in wiping.

x: Considerable friction is felt in wiping.

(e) Secondary Slippage

After 10 days from formation of a water-repellent layer, the way of slip in wiping was evaluated under the same conditions as those of the initial slippage.

According to the evaluation result, results of a water absorption property, visibility, initial slippage and secondary slippage were all preferable in all of Examples 1 to 8. In every example, a water contact angle was equal to or larger than 100 degrees, which is considered to contribute to realize preferable slippage and visibility.

On the other hand, regarding comparative examples, a water contact angle becomes narrow basically in cases (Comparative Examples 1 to 4) where cleaning or plasma treatment is not performed, which leads to a result that slippage becomes poorer than that of the examples. In Comparative Example 1 wherein a water-repellent layer is not formed, an initial antifog property is preferable by the effect of surfactant, though white fogging occurs on a lens causing poor visibility in a durability test by dipping in running water shown in Table 3. This is because loss of surfactant caused an increase in the contact angle so that a water film was not formed.

Comparative Example 5 results in a poor water absorption property and visibility, though a water-repellent layer is amino-modified silicone of the present invention. This is considered because suitability for a water-repellent layer is insufficient since the compound of Comparative Example 5 is different from that of a water-absorbing layer of the present invention. Moreover, the structure of Comparative Example 5 is also poorer than that of the examples in terms of durability and water resistance (weather resistance).

In Comparative Examples 7 to 9, the contact angle did not reach 100 degrees, causing respectively poor visibility, though cleaning and plasma treatment were performed. Moreover, slippage was also poorer than that of the examples. This is considered because a water-repellent layer is not amino-modified or mercapto-modified silicone of the present invention.

Regarding Comparative Example 6, though a contact angle was equal to or larger than 100 degrees at an initial stage of preparation which was a preferable result equivalent to that of the examples, the contact angle became smaller than 100 degrees over time which resulted in poor slippage at last, similar to Comparative Examples 7 to 9. This is considered because suitability for a water-repellent layer is insufficient since the compound of Comparative Example 6 is different from that of a water-repellent layer of the present invention.

TABLE 3

| | | | Example 5 | Comparative Example 1 |
|---|---|---|---|---|
| Initial | Antifog Property | Water Absorption Property | ○ | ○ |
| | | Visibility | ○ | Water Film |
| | Water Repellency | Water Contact Angle | 104.1 | <10 |
| | | Slippage | ◎ | X |
| Durability *3 | Antifog Property | Water Absorption Property | ○ | ○ |
| | | Visibility | ○ | X |
| | Water Repellency | Water Contact Angle | 103.9 | 67.1 |
| | | Slippage | ◎ | X |

*3 A lens was dipped in running water for 2 hours and then dried by air drying for one day, and an evaluation was made.

What is claimed is:

1. An antifog optical article comprising a water-absorbing layer consisting primarily of a urethane or an acrylic resin having a polyoxyethylene chain represented as —(CH$_2$CH$_2$O)n- formed on a surface of a glass or plastic base material, and a water-repellent layer consisting primarily of at least one of an amino-modified silicone and a mercapto-modified silicone formed on a surface of the water-absorbing layer, wherein a contact angle with respect to water on a surface of the water-repellent layer is set equal to or larger than 100 degrees.

2. The antifog optical article according to claim 1, wherein the thickness of the water-absorbing layer is 1.0 to 50 μm.

3. The antifog optical article according to claim 1 or 2, wherein the thickness of the water-repellent layer is 0.5 to 20 nm.

4. A manufacturing method of an antifog optical article, comprising:

forming a water-absorbing layer consisting primarily of a urethane or an acrylic resin having a polyoxyethylene chain on a surface of a glass or plastic base material;

applying a surface activation treatment to a surface of the water-absorbing layer; and forming a water-repellent layer consisting primarily of at least one of an amino-modified silicone and a mercapto-modified silicone on a surface of the water-absorbing layer, so that a contact angle with respect to water on a surface of the water-repellent layer is set equal to or larger than 100 degrees.

5. The manufacturing method of an antifog optical article according to claim 4, wherein a water-soluble component is removed from a surface and an inner part of the water-absorbing layer before the surface activation treatment.

6. The manufacturing method of an antifog optical article according to claim 4 or 5, wherein the surface activation treatment is a plasma treatment.

* * * * *